United States Patent [19]

Toemmeraas

[11] 3,880,455

[45] Apr. 29, 1975

[54] SHOCK ABSORBING VEHICLE BUMPER ASSEMBLY

[76] Inventor: Nils Christian Toemmeraas, Froeyslandsvei 28, 2830 Raufoss, Norway

[22] Filed: Mar. 12, 1973

[21] Appl. No.: 340,538

[30] Foreign Application Priority Data

Mar. 14, 1972 Norway ................................ 807/72

[52] U.S. Cl. ...................................... 293/99; 293/88

[51] Int. Cl. ........................................... B60r 19/04

[58] Field of Search ............ 293/70, 73, 85, 86, 88, 293/99, DIG. 2, DIG. 5

[56] References Cited

UNITED STATES PATENTS

| | | | |
|---|---|---|---|
| 1,512,917 | 10/1924 | Finizio | 293/86 |
| 1,578,956 | 3/1926 | Clark | 293/86 |
| 3,610,609 | 10/1971 | Sobel | 293/86 |
| 3,656,792 | 4/1972 | Tavano, Sr. | 293/88 |
| 3,677,595 | 7/1972 | Hamilton | 293/73 |
| 3,702,202 | 11/1972 | Rumsey | 293/99 |
| 3,795,418 | 3/1974 | Barenyi et al. | 293/88 |

*Primary Examiner*—Richard A. Schacher
*Assistant Examiner*—Robert Saifer
*Attorney, Agent, or Firm*—Hill, Gross, Simpson, Van Santen, Steadman, Chiara & Simpson

[57] ABSTRACT

A shock absorbing vehicle bumper assembly, in which a bumper is supported by a plurality of shock absorbing units connected between the bumper and the frame of a vehicle, such as one of the automotive type. The shock absorbing units are so mounted as to provide a resilient resistance toward compression in response to an impact tending to move the bumper toward the vehicle frame, and the units being arranged so as to restore the bumper to its initial outer position spaced from the frame following a shock or impact. The units are also arranged to permit a lateral movement of a bumper relatively to the longitudinal axis of the vehicle in the event the impact occurs at one side of the central region of the bumper, in a manner such that the curved end of the bumper will not damage the vehicle body. The shock absorbing units will also have a cushioning effect and the ability to absorb at least a material portion of the energy provided by an impact.

7 Claims, 6 Drawing Figures

1
2
4
5
3
4
6
7

1
2
5
4
8
4
3

1
12
11
15
2
18
17
9
19
13
14
18
16
20
5
22
21

11
10
12
3
18
19
21
9
14
13
15
5
16

5
30
11
25
27
29
3
18
21
VI
VI
24
28
23
13
15
26
16
31

27
30
13
3
5
11
15
18
23
29
28
24
21
25
26
31
16

SHOCK ABSORBING VEHICLE BUMPER ASSEMBLY

BRIEF SUMMARY OF THE INVENTION

A simple method for attaching a bumper to a vehicle is to rigidly connect one end of the shock absorbing unit to the vehicle frame and rigidly connect the other end of the unit to the bumper. Where two or more such units are utilized, with such an arrangement, a bumper may move only inwardly and outwardly with respect to the vehicle upon a central impact on the bumper, when an impact out of the central region of the bumper would result in objectionably strong bending or shearing stresses on the parts of the shock absorbing units.

Another possible arrangement is to fixedly mount the shock absorbers to the frame of the vehicle and pivotally connect them to the bumper. This arrangement may give a satisfactory cushioning and resilient resistance effect, but there are certain objections to the geometry of movement of the bumper by virtue of an off-center impact. In that event the bumper would pivot around the shock absorber connection farthest from the point of impact, and the curved end of the bumper, which originally has a small lateral clearance from the vehicle body, would move inwardly toward the body of the vehicle and likely damage the same. With this same arrangement, if a central impact of sufficient magnitude to bend the bumper occurs, then there is a terrific bending stress upon the shock absorbing parts of each unit because of the fixed connection with the vehicle frame. By using a system of this kind, the distance of the curved ends of the bumper from the vehicle body must be increased if damage thereto is to be avoided upon an offcenter impact. But the present narrow spacing of the curved end of the bumper from the vehicle body is required by the appearance designers, and possibly by the width limit of the vehicle in its entirety.

It is an important object of the instant invention to so mount the bumper with a small lateral clearance from the vehicle body, and at the same time avoid any damage to the vehicle body by virtue of an off-center impact on the bumper. Excess bending stresses are also eliminated in the shock absorbing units even with a central impact great enough to bend the bumper. This is accomplished by either pivotally connecting one end of each absorber unit to the frame of the vehicle, or connecting that end of an absorber unit to the vehicle by means of an elastomer which provides sufficient flexibility for both angle variation and lateral displacement of the bumper. An elastomer connection may also be made to the bumper itself at the other ends of the absorber units if the same is deemed desirable.

DETAILED DESCRIPTION

While the instant invention may embody as many shock absorbing units as may be desired, depending upon circumstances, the invention is herein described utilizing two units, which in most cases should be a sufficient number.

Figure 1:
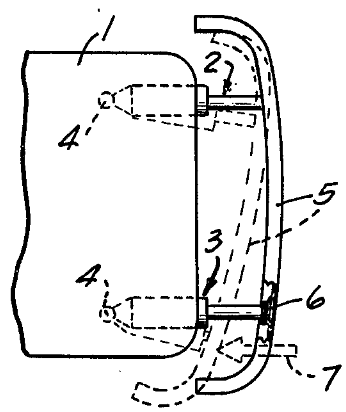
FIG. 1 is a fragmentary diagramatic plan view illustrating the action of a bumper mounting assembly embodying improvements of the instant invention when an off-center impact occurs.
Figure 2:
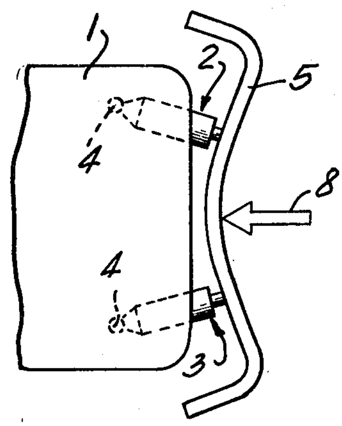
FIG. 2 is a fragmentary plan view similar to FIG. 1, but illustrating the action of the bumper mounting upon a heavy central impact on the bumper.

In FIGS. 1 and 2, I have diagrammatically illustrated the operation of the instant invention. A part of the body of a vehicle of the automotive type is indicated by numeral 1. Connected to the body 1 at desirable points, such as the frame, is a pair of spaced impact cushioning units generally indicated by numerals 2 and 3. One end of each unit is connected to the vehicle at 4 in a manner to permit pivotal movement of the unit at the point of connection. The impact cushioning units 2 and 3 may be in the form of conventionally known telescopic shock absorbers of a suitable size to neutralize sudden and heavy impacts on a bumper 5 to which the other ends of the units 2 and 3 are each connected as indicated at 6 with a resilient connection as will later be described.

With reference now to FIG. 1, assuming that an impact with the bumper 5 occurs as indicated by the arrow 7 at a point well to one side of the center of the bumper 5, as a result of such impact, the bumper will tend to assume the position shown in the dotted lines and the units 2 and 3 will pivot slightly around the points 4 toward the point of impact, as also indicated by dotted lines. It should be especially noted that there will also be a slight pivoting of the bumper around the end of the unit 2 at the point of attachment, that unit being farther from the point of impact than the unit 3. In making such a movement, it will be especially noted that the curved end of the bumper nearest the point of impact will actually move away from the body of the vehicle, rather than toward the body, thereby eliminating injury to the vehicle body by the bumper itself when an impact occurs. When the vehicle is moved free of the object causing the impact, the bumper will automatically be restored to its original position by action of the units 2 and 3.

With reference now to FIG. 2, assuming there is an impact of sufficient magnitude to actually bend the bumper 5 occurring at the center of the bumper, as indicated by the arrow 8, the units 2 and 3 will pivot inwardly toward each other as illustrated in full line and neutralize the effects of the impact. Depending upon the condition of the bumper, or the amount of bending thereof, the bumper may or may not be fully restored to original position following the impact. In both the above illustrated instances, there will be no undue bending or shearing stresses placed upon the shock absorbing units.

Figure 3:
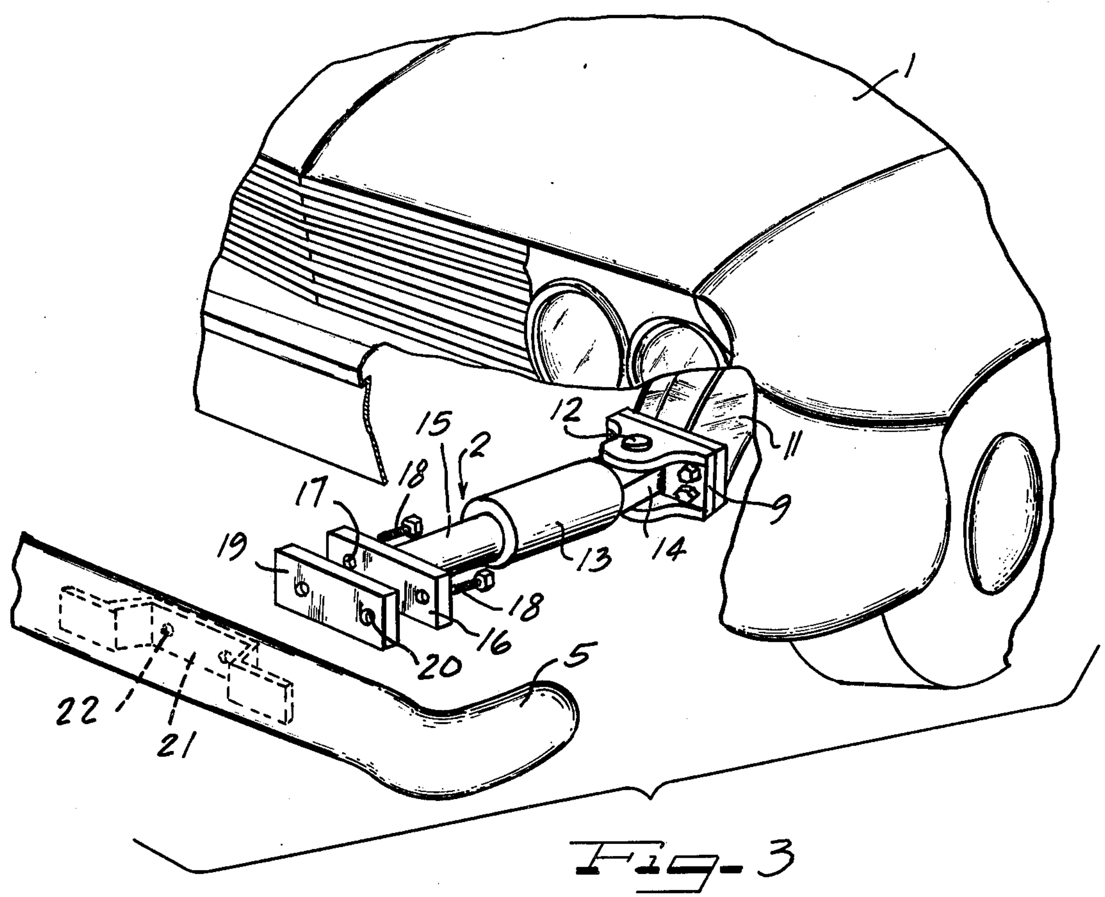
FIG. 3 is an enlarged fragmentary perspective exploded view of the bumper and connections therefore incorporating the first embodiment of this invention.
Figure 4:
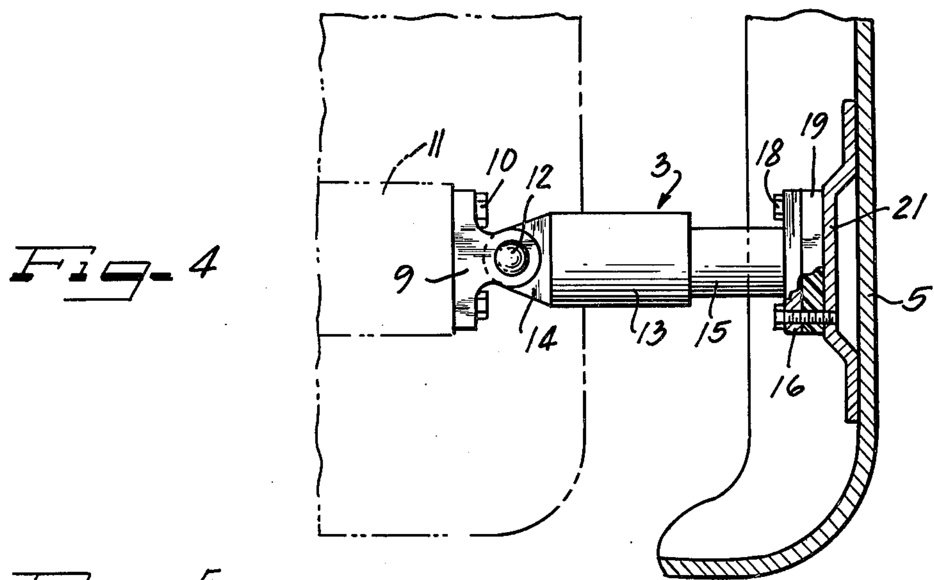
FIG. 4 is a fragmentary top plan view of a structure of FIG. 3 assembled.

In FIGS. 3 and 4 I have illustrated the first disclosed embodiment of this invention. In this instance, a U-shaped bracket 9, is bolted or equivalently secured as indicated at 10 to the frame 11 of the vehicle. The arms of the bracket 9 extend outwardly one above the other and are apertured to accommodate a pivot pin 12. The cylinder 13 of each shock absorbing unit 2 or 3 is provided with a lug 14 extending between the arms of the bracket 9, and which lug is apertured to freely receive the pivot pin 12, whereby the shock absorbing unit freely pivots in a lateral plane about the pin 12. The positioning of the arms of the bracket 9 with the lug 14 disposed therebetween prevents any vertical pivoting of the shock absorbing unit, it being preferable that the bumper is carried by the shock absorbing units, in which event pivoting of the bumper in a vertical direction is not desired. The piston rod 15 of each shock absorbing unit is provided on its outer end with a mounting plate 16 having threaded apertures 17 therethrough to accommodate bolts 18. Another plate 19 made of an elastomer formed from any suitable elastomeric material and provided with apertures 20 which are preferably unthreaded so the bolts 18 extend freely therethrough is disposed between the plate 16 and a mounting yoke 21 welded or equivalently secured to the inside of the bumper 5. This mounting yoke is preferably provided with threaded apertures 22 into which the bolts 18 may be threadedly engaged to firmly anchor the relative parts in position.

With the arrangement of FIGS. 3 and 4, the shock absorbing units 2 and 3 may pivot relatively to the vehicle frame in either direction in the lateral plane and elastomer 19 provides some freedom of movement between the piston rod of a shock absorber and a bumper to compensate for any shearing or bending action that might result to the shock absorber at that point.

Figure 5:
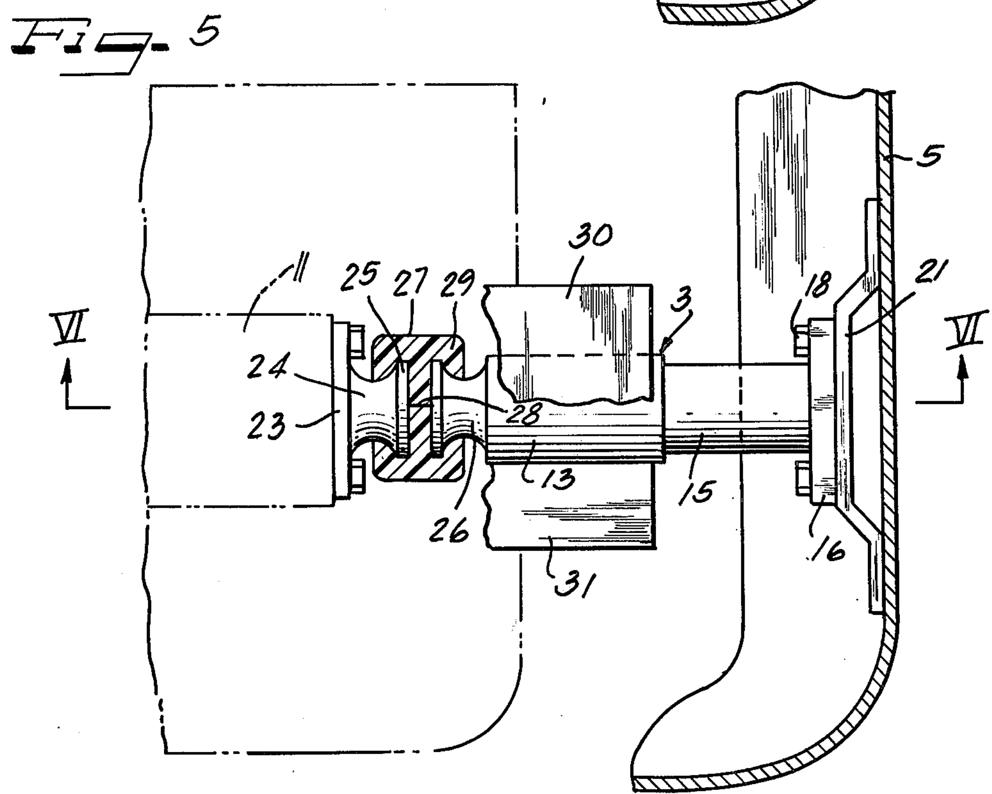
FIG. 5 is a fragmentary plan view, with parts broken away, illustrating the second embodiment of the instant invention.
Figure 6:
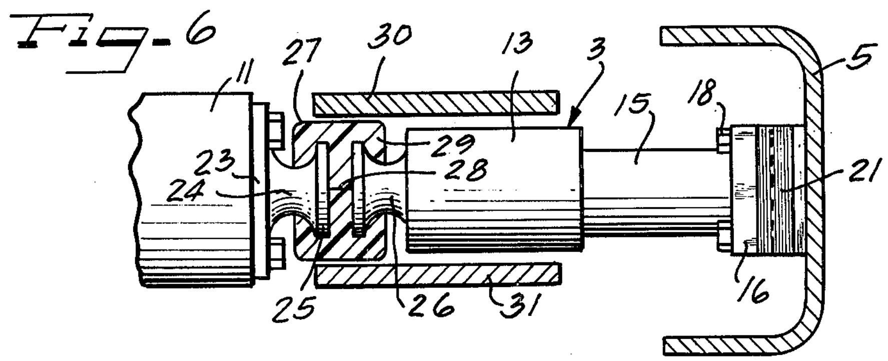
FIG. 6 is a fragmentary view of parts shown in section taken substantially as indicated by the line VI—VI of FIG. 5.

In the embodiment shown in FIGS. 5 and 6, a plate 23 is secured to the frame 11 for each shock absorbing unit, and that plate carries a stud 24 having an enlarged head 25 of greater diameter than the remainder of the stud. A similar headed stud 26 is carried on the inner end of the cylinder 13 of each shock absorbing unit. These studs 24 and 26 are connected by an annular elastomer 27 which extends between the studs as seen at 28 and has a portion 29 folded over and around each stud head thereby effectively but resiliently connecting the shock absorbing element to the vehicle frame. In this instance the plate 16 carried upon the piston rod of the shock absorbing unit may be directly connected to the yoke 21 of the bumper 5. It is believed that such a rigid connection at the bumper will be compensated for as far as bending moments in the shock absorber are concerned by the flexibility of the elastomer 27, but incase that would not be deemed satisfactory, the elastomeric plate 19 of FIGS. 3 and 4 may be mounted between the plate 16 and the bumper yoke 21 to insure neutralization of any bending stresses on the shock absorber. In this instance, however, the annular elastomer 27 permits pivotal movement of each shock absorbing unit and the bumper in substantially any direction and for this reason suitable guide plates 30 and 31 are attached to the vehicle above and below the elastomer 27 and the cylinder 13 of the respective unit to eliminate vertical pivotal movement of the shock absorbing units and the bumper.

The operation of both embodiments above described is substantially the same as explained above in connection with the diagrammatic showing of FIGS. 1 and 2.

It will also be noted that the mounting of the bumper to the vehicle is effective in cushioning impacts against the bumper, and is economical in construction and durability.

I claim:

1. A shock absorbing assembly for attaching a channel shaped bumper to a vehicle in a manner leaving the entire outer face of the bumper free and clean from any visible connecting part, wherein the improvement comprises at least two substantially parallel shock absorbing units, first connecting means attaching one end of each unit to the vehicle in a manner permitting lateral pivotal movement of the unit relatively to the vehicle, and second connecting means attaching the opposite end of each unit to the bumper inside the channel thereof, said second connecting means including an elongated plate member attached to the shock absorbing unit, an elongated mounting yoke member for attachment to the inside of the bumper and an elongated elastomer member mounted between said plate member and said mounting yoke member, said plate member, elastomer member and mounting yoke member being secured to each other and extending transversely to the axis of the shock absorbing unit.

2. The shock absorbing assembly of claim 1, wherein the bumper is carried by said units.

3. The shock absorbing assembly of claim 1, wherein said first connecting means comprise a U-shaped bracket element with the arms thereof disposed one above the other, a lug element extending between said arms, and a pivot pin extending through said arms and said lug, one of said elements being secured to said vehicle and the other element to the adjacent end of the respective shock absorbing unit.

4. The shock absorbing assembly of claim 1, wherein said first connecting means comprise like studs extending from the vehicle and adjacent end of the respective unit, and an elastomeric element connecting said studs.

5. The shock absorbing assembly of claim 4, wherein each of said studs is provided with an enlarged head, and said elastomer is shaped to extend between the confronting faces of said heads and integrally over the circumference and inwardly over the opposite side of each said head.

6. The shock absorbing assembly of claim 5, including upper and lower guide plates adjacent said elastomer to limit the pivotal movement of the respective unit to substantially a horizontal plane.

7. The shock absorbing assembly of claim 1, wherein said shock absorbing units are conventional automotive telescopic shock absorbers including a cylinder with a piston therein and a piston rod protruding therefrom.

* * * * *